April 21, 1942.   G. J. THOMAS   2,280,134
VEHICLE BRAKE
Filed Jan. 11, 1939   2 Sheets-Sheet 1
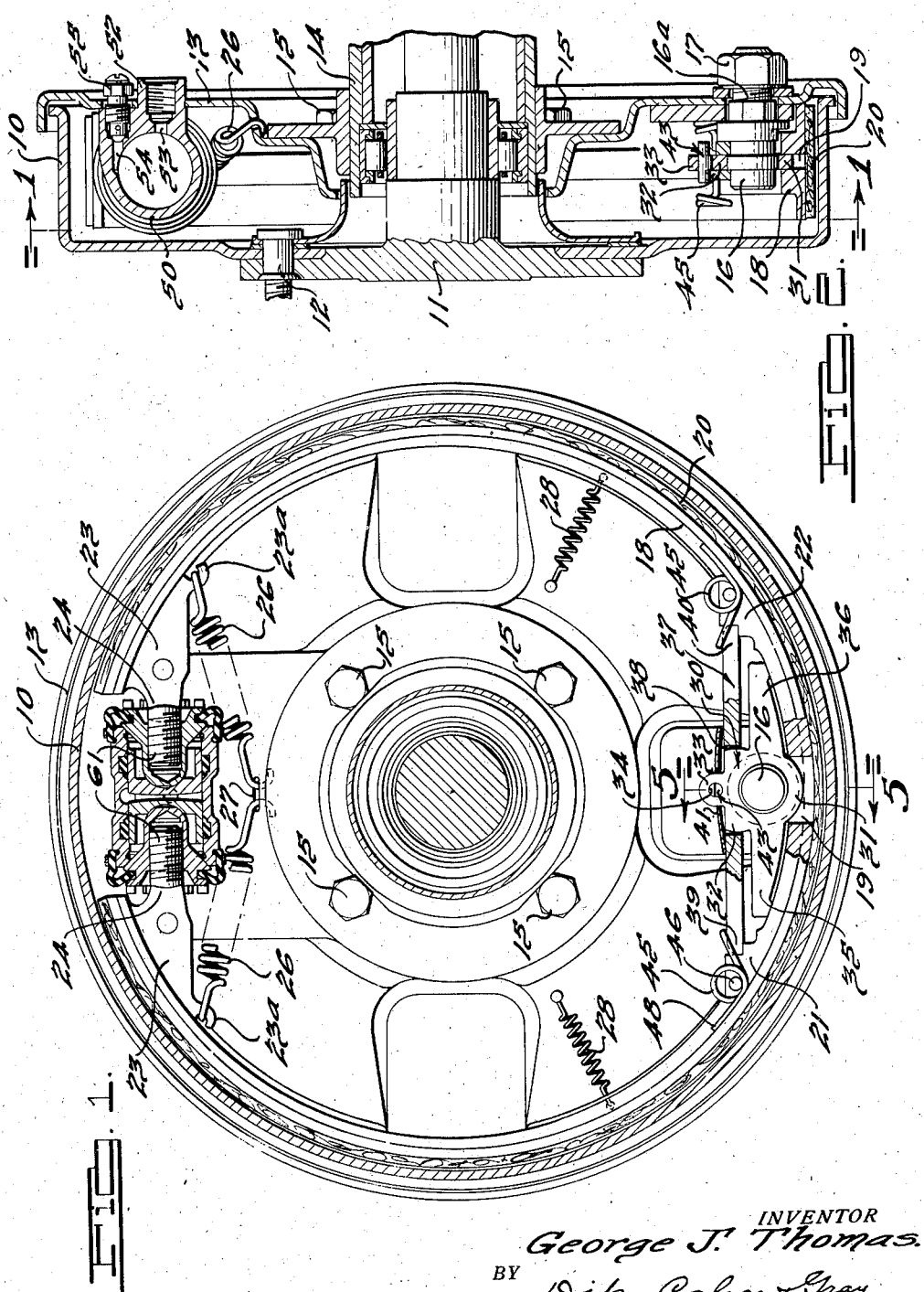
INVENTOR
George J. Thomas.
BY Dike, Calver & Gray
ATTORNEYS

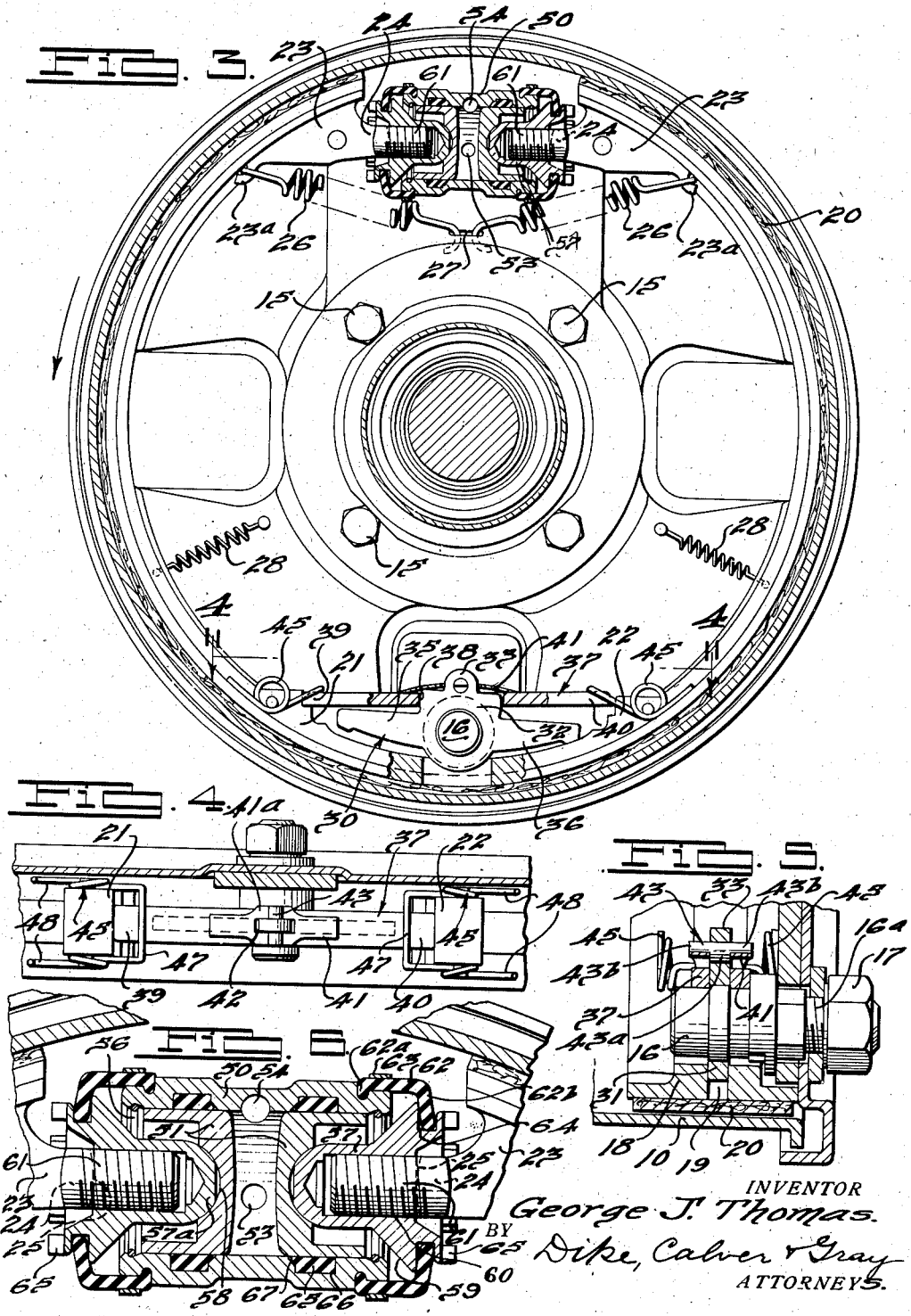

Patented Apr. 21, 1942

2,280,134

UNITED STATES PATENT OFFICE 2,280,134

VEHICLE BRAKE

George Joseph Thomas, Detroit, Mich.

Application January 11, 1939, Serial No. 250,291

10 Claims. (Cl. 188—78)

This invention relates to vehicle brakes of the internal expanding type which are operated either mechanically or hydraulically.

One of the objects of the invention is to provide an improved brake structure in which the brake operating force is distributed to different parts of the shoe by improved self-actuating mechanism which is responsive to the brake application force.

Another object of the invention is to provide a brake of the foregoing character in which the self-actuating or brake energizing mechanism is of relatively simple construction and more efficient in operation.

A further object of the invention is to provide a brake structure including a transversely split brake shoe or brake band adapted for engagement with a brake drum, the shoe being expanded or applied by the application of force to the split end portions thereof and energizing means, including for example a rockable device located at a point intermediate the ends of the shoe and preferably mounted upon the anchor pin, being provided and responsive to the brake application force for exerting pressure simultaneously at a plurality of spaced points on the shoe thereby more uniformly distributing the pressure between the shoe or brake band and the drum and materially increasing the efficiency and life of the brake while reducing the effort required to operate the brake.

Another object of the invention is to provide a vehicle brake having a brake shoe adapted to be actuated by the application of force to the split ends of the shoe and having energizing means associated with the anchor pin and responsive to the brake application force for exerting pressure upon the shoe simultaneously at opposite sides of the anchor pin.

A still further object of the invention is to provide an improved vehicle brake having a split brake shoe and means for applying pressure to the shoe at two points adjacent the split ends of the shoe to apply the brake and also including self-energizing means actuated by rotative movement of the brake shoe to simultaneously apply pressure to the shoe at two points intermediate the split ends thereof.

A further object of the invention is to provide improved self-actuating mechanism for transmitting the force applied to the brake shoe simultaneously to a plurality of spaced points of the brake shoe remote from the original point or points of application of the force to said shoe.

A further object of the invention is to provide a brake structure which includes a hydraulically actuated wheel cylinder of improved construction.

A still further object of the invention is to provide a wheel cylinder having improved easily accessible adjusting means for varying the position of the brake shoe with relation to the brake drum.

The above and other objects and advantages of the invention will appear from the following description and appended claims when considered in connection with the accompanying drawings forming a part of this specification in which like reference characters designate corresponding parts in the several views.

In said drawings:

Fig. 1 is a vertical sectional view taken along the line 1—1 of Fig. 2, looking in the direction of the arrows, and showing the parts in released position.

Fig. 2 is a vertical section taken through the center of the brake structure shown in Fig. 1.

Fig. 3 is a view similar to Fig. 1 but showing the position of the parts when the brake is applied.

Fig. 4 is a fragmentary horizontal section taken substantially along the line 4—4 of Fig. 3, looking in the direction of the arrows.

Fig. 5 is an enlarged fragmentary vertical sectional view taken substantially along the line 5—5 of Fig. 1, looking in the direction of the arrows; and Fig. 6 is an enlarged fragmentary section of the wheel cylinder of the preceding views showing the parts in brake applied position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawings, the brake construction of the present invention, as shown, comprises a brake drum 10 which is secured to the wheel hub 11 by means of bolts or the like 12. A suitable backing plate 13 for closing the end of the drum is secured by means of bolts and nuts 15 to the axle housing shown generally at 14. An anchor pin 16 is mounted in the backing plate 13 and has a threaded shank 16a which projects through a hole or opening in the plate and is secured to the plate by a nut 17. The anchor pin, as will be presently described, is provided for the purpose of supporting the actuating or energizing mechanism described in detail below.

The brake includes a one-piece brake band or shoe 18 provided preferably at a central point with a slot or recess 19. The metallic brake band or shoe 18 is flexible throughout its length and is provided with a suitable brake lining 20. At opposite sides of the slot or recess 19 the brake shoe 18, on its inner face, is provided with stepped lugs or projections 21 and 22. The free ends of the shoe are spaced apart a suitable distance and provided with opposed lugs or projections 23 having reduced ends or heads 24 each of which is provided with convex faces 25, see particularly Fig. 6. The lugs 23 have hook-like portions 23a to which the ends of coiled springs 26 are attached, the opposite ends of the springs being hooked through a slot 27 formed in the backing plate 13. The springs 26, together with similar but smaller coiled springs 28 tend to hold the brake shoe normally in released position as shown in Fig. 1. It will be understood that one end of each of the springs 28 is secured to the brake shoe and the opposite end thereof to the backing plate 13.

The anchor pin 16 supports, for rockable movement, a double armed lever member shown as a whole at 30. The member 30 has a central body portion provided with a rounded or arcuate lower end 31 which projects into the slot or recess 19 in the brake shoe, an enlarged upper arm portion 32 and a reduced upward projection 33 having a transverse hole or opening 34 formed therein. The member 30 has outwardly extending arms 35 and 36 which are both adapted to engage the brake shoe when the brake is in the released position of Fig. 1. When the brake is applied, however, either one or the other of the arms 35 and 36 will engage the brake shoe to exert pressure thereon in response to the brake applying force. The self-actuating mechanism also comprises an energizing member or link shown as a whole at 37 and provided with a central slot or opening 38. The ends 39 and 40 of the link are adapted to be seated and to engage the shoulders or abutments in the stepped bosses or lugs 21 and 22, respectively, of the brake shoe, see particularly Fig. 1. When the link 37 is assembled with the rockable member 30, the enlarged upper portion 32 of the member is located within the slot 38 of the link. Relative rocking movements of the energizing link and bell crank lever or member 30 are permitted by reason of the curvature of the edges of the portion 32 and a slight clearance thereof in the slot. The link 37 is preferably held down in position with relation to the rockable member 30 by means of a relatively stiff bowed spring plate or leaf 41 which, as seen in Fig. 4, is centrally slotted at 42 so as to embrace the projecting lug 33 of the rockable member. The spring plate 41 is held in place, so that its opposite ends engage and press against the top face of the link 37, by a pin 43 the central portion 43a of which is rounded and fits within the slot 42, the end portions 43b of the pin having their lower halves removed so as to provide flat faces overlying the enlarged central portion 41a of the spring plate. As best seen in Fig. 5, the central cylindrical portion 43a of the pin is located within the hole 34 in the lug 33 of the rockable member 30. Thus the pin will be maintained in position against accidental displacement and will maintain the spring plate 41 always in operative relation with respect to the energizing member 37.

The ends 39 and 40 of the energizing link are preferably held pressed against their respective lugs 21 and 22 by means of springs 45. Each spring is held in position upon the lugs by a pin 46, the closed or U-shaped portion 47 of the spring overlying the end of the link and the free ends of legs 48 thereof bearing against the inner face of the brake shoe. By referring to Fig. 3, in which the position of the rockable member 30 and energizing link 37 may be slightly exaggerated for the purposes of illustrating the action more clearly, it will be seen that while the springs 45 tend to maintain the ends of the link 37 in contact with the shoulders or abutments on the stepped lugs 21 and 22, when the brake is applied with the wheel rotating for example in a counterclockwise direction, only one end of the link is in contact with a lug, namely the end 39 engaging the stepped portion of the lug 21. The spring 45 at the right hand side of Fig. 3 permits the end 40 of the link when tilted slightly to move slightly away from its stepped lug 22.

In the present instance the brake shoe is expanded through the medium of a hydraulic actuator which is located diametrically opposite the anchor pin 16 and located between the ends of the shoe. The actuator, as illustrated in Figs. 1, 2 and 6, comprises a cylinder 50 secured to the brake backing plate in any suitable manner. The cylinder is provided with a pair of opposed relatively slidable cup-shaped pistons 51. The cylinder at the back thereof is provided with a boss 52 having a passage 53 for the flow of the braking fluid to and from the pressure zone of the cylinder between the inner ends of the pistons. Above the passage 53 the cylinder is provided at the uppermost point thereof with a bleeder passage 54 which is controlled through the medium of a suitable screw threaded valve 55. Within annular grooves in the outer ends of the cylinder bore there are located split resilient wire rings 56 which have snap engagement in the grooves and provide stops for limiting the extreme outward movement of the pistons.

Between each piston 51 and one of the brake shoe lugs 23 is located a two-part transmission or thrust device. The outer thrust member 57 of this device comprises a hollow piece having a cylindrical shank extending axially into the piston and having a rounded or dome-shaped end 57a seated within a correspondingly shaped concave socket 58 formed on the inner face of the head of the piston. The outer end of the member 57 is flared outwardly to provide a frusto-conical portion 59 adapted to engage the chamfered edge at the extreme end of the bore of the cylinder 50. Thus, engagement of the tapered or flared head 59 of the thrust member 57 with the end of the cylinder bore will limit the inward movement of the piston under the action of the return spring 26 when the brake is released.

The outer thrust member 57 of the thrust device has a central threaded bore 60 to receive a cylindrical exteriorly threaded stem or thrust piece 61. The outer end of this member 61 has a transverse slot within which the end 24 of the lug 23 fits.

Mounted upon each end of the cylinder 50 is a cup-shaped resilient rubber boot 62 which not only functions to exclude dust and foreign particles but also functions to control the position of the outer thrust member 57. The boot 62 has an annular bead 62a fitting into an external groove in the cylinder. A split spring clamping ring 63 assists in holding the boot upon the end of the cylinder. The boot 62 also has an annular inwardly directed web or flange portion 62b apertured to receive the thrust member, the circular edge of the aperture fitting into a groove 64 in the outer end of the member 57. Since the hole or aperture in the bottom of the sealing boot 62 has a slightly smaller diameter than the diameter of the retaining groove 64, the end web 62b of the boot will be distorted and placed under stress when in assembled position, as shown in Fig. 6. The boot will, therefore, act as a frictional lock to grip and hold the thrust member 57 in adjusted position against turning movement. The end of each member 57 is provided with a series of annularly arranged projecting teeth 65, preferably wedge-shaped in cross section, and designed for the reception of a tool to permit turning of the thrust member 57 relatively to the inner thrust member 61 thereby adjusting the latter longitudinally of the bore 60 to vary the brake shoe clearance.

From the foregoing it will be seen that in the fully retracted positions of the pistons, as seen in Fig. 1, the pistons will be centered in the cylinder bore by engagement of the frusto-conical heads 59 of the pistons with the end edges of the bore. When the pistons move outwardly under the pressure of fluid introduced through the passage 53 the members 57 will substantially float, being yieldingly guided and supported at their outer ends by the resilient rubber boots 62 and being free for limited universal movement by the substantially ball and socket structure 57a and 58. The boots 62 have sufficient stiffness, however, to hold the members 57 approximately centered at all times.

For the purpose of effecting a seal between the pistons 51 and the cylinder walls there is provided between each of the pistons and the annular wall of the cylinder a packing ring 65. Each packing ring is formed of a material which is relatively non-compressible and which may be distorted or stressed so that a portion thereof may be displaced laterally. In the present instance the material of the packing ring is rubber or suitable elasticity, which may be either natural or synthetic. Each of the cylinder portions within which one of the pistons is located is provided with an annular groove which opens toward the associated piston. This annular groove is disposed intermediate the ends of the piston and is formed in two portions, one of which, designated 66, may be said to be an annular rectangular portion and the other of which, designated 67, may be said to be an annular triangular portion. The former forms the major portion of the groove and the latter the minor portion thereof. It will be noted that the tapered portion 67 of the groove connects into the open portion of the groove 66 on the side toward the pressure zone of the cylinder. The bottom of the triangular groove portion 67 is inclined toward the bottom of the rectangular portion 66. The packing ring normally has a shape substantially like that of the groove 66 and is designed so that its axial dimension is the same as the axial dimension of the groove 66, but its radial extent is greater than the radial extent of the groove 66. Thus, the inner diameter of the packing ring 65 is less than the inner diameter of the rectangular groove portion 66. Hence, the mass of the packing ring is greater than the volumetric capacity of the rectangular groove portion 66 so that normally the packing ring extends radially inwardly beyond the wall of the cylinder. As a result, upon assembly of the piston with the cylinder by inward movement of the former, the packing ring is distorted or stressed and a portion thereof is displaced into the triangular portion 67 of the groove, this portion forming a lip facing toward the pressure zone of the cylinder.

From the foregoing it will be seen that the packing ring closely engages both the cylinder and piston and by reason of the displacement of a portion of the packing ring into the relieved portion 67 of the groove any pressure upon the packing ring exerted by the braking fluid serves to bring the packing ring more closely into engagement with the cylinder and piston. By virtue of this construction, therefore, there is provided an annular groove disposed intermediate the ends of the piston with the inner edge of the groove nearer the pressure zone relieved to provide an annular tapered portion normally substantially unoccupied by the packing ring, the ring normally when unstressed extending radially inwardly beyond the inner edges of the groove but being placed in compression when the piston and cylinder are assembled thereby to displace a portion of the packing ring in the direction of the pressure zone to occupy the relieved portion of the groove. This construction has been found by exhaustive tests to provide a very effective seal against leakage of the braking fluid past the piston.

When the braking fluid is delivered to the wheel cylinder 50 under pressure to force the pistons 51 outwardly, this motion is transmitted from the two-part thrust devices 57, 61 to the brake shoe lugs 23 thereby moving the split ends of the shoe outwardly into engagement with the drum while at the same time expanding the shoe as a whole against the drum. As soon as contact between the shoe and drum is effected the rotation of the drum tends to rotate the brake shoe in the same direction, as for instance shown by the arrow in Fig. 3. This action is counteracted by the rockable lever 30 upon the anchor pin 16. The brake shoe 18, by reason of the slight rotational movement transmitted thereto by the drum, exerts through lug 21 a force upon the end 39 of the energizing link 37 which force is transmitted to the arm 32 of the bell crank lever 30, thereby rocking the lever as shown in Fig. 3. At the same time the energizing link 37 tilts or rocks about the portion 32 of the lever. The result of this compound action is the application of an outward force through lever arm 36 to the brake shoe at one side of the anchor pin and also the application of an outward reaction force through the link end 39 and lug 21 to the brake shoe at the opposite side of the pin. Two rather widely spaced substantially equal pressure points are thus produced at the side of the brake drum opposite to the wheel cylinder. It will be seen, therefore, that operation of the hydraulic actuator produces two pressure points adjacent the ends of the shoe, at which points the pressure is substantially uniform, and also two similar pressure points spaced substantially as far apart at the opposite side of the shoe, the energizing link and rockable lever which produce the pressures at these latter points being responsive to the brake application force and energized by rotational movement of the shoe.

It will be understood that a similar but reverse action will take place when the brake drum rotates in the opposite or clockwise direction and the brake is applied. In such instance the pressure points intermediate the split ends of the shoe will be at the points of contact of the arm 35 and portion 40 of the link with the brake shoe when the lever and energizing link are rocked in the opposite direction from that shown in Fig. 3.

The invention thus provides a brake in which the brake shoe is pressed against the drum under a substantially uniform pressure, outward forces upon the shoe being simultaneously applied to the shoe at four widely spaced points. Hence, a brake of great efficiency is provided in which the effort required to operate the brake is reduced, the life of the brake lining materially increased, and smoother and more positive braking action under all conditions achieved.

I claim:

1. In a brake, in combination, a brake drum, a brake shoe adapted for engagement with the drum, a backing plate, means for applying a force to one end of said shoe to bring the shoe into engagement with the drum, an anchor pin mounted upon the backing plate, a rockable member carried by said pin and having its ends engageable with said brake shoe, and an energizing link associated with said member and having its ends engageable with the shoe, said member and link providing means for transmitting said force to the shoe at spaced points remote from said end of the shoe.

2. In a brake, in combination, a brake drum, a brake shoe adapted for engagement with the drum, a backing plate, means for applying a force to one end of said shoe to bring the shoe into engagement with the drum, an anchor pin mounted upon the backing plate, a rockable member carried by said pin and having its ends engageable with said brake shoe, and an energizing link associated wtih said member and having its ends engageable with the shoe at points spaced from the points of engagement of the rockable member with the shoe, said member and link providing means for transmitting said force to the shoe at a plurality of points all remote from said end of the shoe.

3. In a brake, in combination, a brake drum, a brake shoe adapted for engagement with the drum, a backing plate, means for applying a force to one end of said shoe to bring the shoe into engagement with the drum, an anchor pin mounted upon the backing plate, a rockable member carried by said pin and having its ends engageable with said brake shoe, and an energizing link associated with said member and having its ends engageable with the shoe at points beyond the ends of the rockable member, said member and link providing means for transmitting said force to the shoe at a plurality of points all remote from said end of the shoe.

4. In a hydraulic brake, in combination, a brake drum, a brake shoe adapted for engagement with the drum, a backing plate, hydraulically operated means for applying a force to one end of the shoe to bring the shoe into engagement with the drum, an anchor pin mounted upon the backing plate, a rockable member carried by said pin and having its ends engageable with said brake shoe, and an energizing member associated with said rockable member and having its ends engageable with the shoe, said members being adapted to be rocked in opposite directions about the pin into engagement with the shoe to transmit said force to the shoe simultaneously at opposite sides of said pin when the brake is applied.

5. In a brake, in combination, a brake drum, a brake shoe adapted for engagement with the drum, a backing plate, means for applying a force to one end of the shoe to bring the shoe into engagement with the drum, an anchor pin mounted upon the backing plate, a rockable member carried by said pin and having its ends engageable with said brake shoe, and an energizing member associated with said rockable member and having its ends engageable with the shoe, said members being adapted to be rocked in opposite directions about the pin into engagement with the shoe to transmit said force to the shoe simultaneously at opposite sides of said pin when the brake is applied.

6. In a brake, in combination, a brake drum, a brake shoe adapted for engagement with the drum, a backing plate, means for applying a force to one end of said shoe to bring the shoe into engagement with the drum, an anchor pin mounted upon the backing plate, a rockable member carried by said pin and having its ends engageable with said brake shoe at opposite sides of the pin, spaced lugs on the inner face of the shoe at opposite sides of said pin, and an energizing member associated with said rockable member and having its ends engageable with said lugs, said first member being rocked in one direction to engage the brake shoe at one side of the anchor pin and said second member being rocked in the opposite direction and engaging a lug at the other side of said pin, whereby to transmit the force to the shoe at two spaced points remote from said end of the shoe when the brake is applied.

7. In a vehicle brake, in combination, a brake drum, a brake shoe, means for applying a force to one end of the shoe to bring the shoe into engagement with the drum, and means responsive to the action of said force to simultaneously press the shoe against the drum at a plurality of spaced points located relatively remote from said end of the shoe, said means comprising a pair of relatively rockable members, one mounted to rock upon the other and the latter pivotally mounted upon a stationary part of the brake.

8. In a vehicle brake, in combination, a brake drum, a transversely split brake shoe, means for effecting engagement of the shoe with the drum by the application of a force to the ends of the shoe thereby causing a rotational movement of the shoe in response to the rotation of the drum, a rockable member pivotally mounted on the brake, and a movable energizing member superimposed and tiltable upon the rockable member in end thrust engagement with the shoe and responsive to said rotational movement of the shoe for rocking said member to cause said member to apply pressure to the shoe at one point and also effective to apply pressure to the shoe at its point of end thrust engagement therewith.

9. In a vehicle brake, in combination, a brake drum, a transversely split brake shoe, means for effecting engagement of the shoe with the drum by the application of a force to the ends of the shoe thereby causing a rotational movement of the shoe in response to the rotation of the drum, a rockable member pivotally mounted on the brake, and a movable energizing member superimposed upon the rockable member in end thrust engagement with the shoe and responsive to said rotational movement of the shoe for rocking said member to cause said member to apply pressure to the shoe at one point and also effective to apply pressure to the shoe at its point of end thrust engagement therewith, said energizing member being adapted to tilt or rock in a direction opposite to the movement of the rockable member when the brake is applied.

10. In a vehicle brake, in combination, a brake drum, a transversely split brake shoe, means for effecting engagement of the shoe with the drum by the application of a force to the ends of the shoe thereby causing a rotational movement of the shoe in response to the rotation of the drum, a rockable member pivotally mounted on the brake, and a movable energizing member superimposed upon the rockable member in end thrust engagement with the shoe and responsive to said rotational movement of the shoe for rocking said member to cause said member to apply pressure to the shoe at one point and also effective to apply pressure to the shoe at its point of end thrust engagement therewith, said energizing member having its pressure point on said brake shoe at the side of the pivot of said rockable member opposite to the pressure point of the rockable member when the brake is applied.

GEORGE JOSEPH THOMAS.